United States Patent Office

2,951,824
Patented Sept. 6, 1960

2,951,824
PROCESS FOR CURING POLYEPOXIDES AND RESULTING PRODUCTS

Pieter Bruin and Feije Hotze Sinnema, Amsterdam, Netherlands, assignors to Shell Oil Company, New York, N.Y., a corporation of Delaware No Drawing. Filed Apr. 5, 1957, Ser. No. 650,857

Claims priority, application Netherlands Apr. 16, 1956

16 Claims. (Cl. 260—47)

This invention relates to a process for curing polyepoxides. More particularly, the invention relates to a new process for resinifying and curing polyepoxides with amines using a special class of activators and to the resulting cured products.

Specifically, the invention provides a new process for resinifying and curing polyepoxides, and preferably glycidyl polyethers of polyhydric phenols having a low chlorine content, which comprises mixing and reacting the polyepoxide with an amine curing agent and a small amount of an activator comprising a member of the group consisting of halohydrins and epihalohydrins. The invention further provides cured products obtained by the above-described process.

It is known that amines may be used to cure epoxy resins. Amines are not particularly desirable curing agents in many cases, however, as they are either too slow in acting or act too quickly. Further, the rate of cure with the amines varies greatly with the epoxy resin so that uniform rates are generally obtained only with resins derived from the same batch.

It is therefore an object of the invention to provide a new method for curing polyepoxides. It is a further object to provide a new process for curing polyepoxides using amine curing agents. It is a further object to provide a new process for curing polyepoxides with amine curing agents that is more easily controlled. It is a further object to provide a new process for curing polyepoxides with amine curing agents that permits one to obtain a uniform rate of cure regardless of the batch of resin. It is a further object to provide a new process for curing polyepoxides that is particularly useful for polyepoxides having very low chlorine content. It is a further object to provide a process for curing polyepoxides with amine curing agents that give products having high heat distortion points. These and other objects of the invention will be apparent from the following detailed description thereof.

It has now been discovered that these and other objects may be accomplished by the process of the invention which comprises mixing and reacting the polyepoxide, which is preferably a glycidyl polyether of a polyhydric phenol having a low chlorine content, with an amine curing agent and a small amount of an activator comprising a member of the group consisting of halohydrins and epihalohydrins. It has been found that the addition of small amounts of these special activators greatly increases the curing rate of the polyepoxides. It has also been found that the increase in rate depends on the quantity of the activator added so that the rate can be varied by varying the amount of the activator.

It has been further found that the increase in rate of cure is not only determined by the quantity of the activator added but also on the original chlorine content of the epoxy resin used. When epoxy resins with a relatively high chlorine content are used, the increase in curing rate due to the addition of the activator will be much smaller than when a polyepoxide with a low chlorine content is used.

As noted below, preferred polyepoxides to be used in the process are those having a low chlorine content, and preferably a chlorine content not exceeding 0.25% by weight. Such chlorine contents are, in contradistinction to higher chlorine contents, excellently reproducible. The great advantage of such polyepoxide having a low chlorine content is that after the addition of a given quantity of activator, it becomes possible to obtain a mixture with a reproducible high chlorine content, so that independent of the polyepoxide batch applied, any desired curing rate with an amine may be obtained.

The activators used in the process of the invention comprise a halohydrin or an epihalohydrin or mixture thereof. By halohydrin is meant compounds having an OH group and halogen atom preferably joined to adjacent carbon atoms. By epihalohydrin is meant compounds having a 1,2-epoxy group, i.e. a

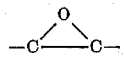

group, and a halogen atom which halogen atom is preferably joined to a carbon atom adjacent to the epoxy group. The halohydrins and epihalohydrins may be aliphatic, cycloaliphatic or aromatic or heterocyclic compounds. If desired, the halohydrins may contain other substituents, such as methoxy groups, ester radicals, ether radicals and the like. Examples of these compounds include, among others, glycerol monochlorohydrin,
glycerol dichlorohydrin,
monophenyl ether of glycerol monochlorohydrin,
monoacetate of glycerol chlorohydrin,
1-hydroxy-2-chlorohexane,
1-hydroxy-2-chlorooctane allyl ether of glycerol monochlorohydrin,
monopropionate of glycerol chlorohydrin cyclohexyl ether of glycerol monochlorohydrin,
1,6-dihydroxy-2-chlorohexane,
epichlorohydrin,
1-chloro-2,3-epoxyhexane,
1-chloro-2,3-epoxycyclohexane and the like.

Particularly preferred activators comprise the mono- and dichlorohydrins of aliphatic polyhydric alcohols containing up to 6 hydroxyl groups, ethers and esters thereof and chloro-epoxyalkanes containing up to 8 carbon atoms.

The activators are employed in small amounts and preferably in amounts so that the resulting mixture of polyepoxide and activator contains less than 1.5% halogen. With the polyepoxides having low chlorine content, this is generally accomplished by adding amounts of activator varying from about .5% up to about 5% by weight of the polyepoxide.

The amine curing agents used in the process of the invention may be any of the epoxy curing agents possessing a plurality of hydrogen attached to amino nitrogen. Examples of these include the mono- and poly- aliphatic cycloaliphatic and aromatic amines containing a plurality of hydrogen attached to nitrogen. Examples of the amines include, among others, ethylene diamine,
diethylene triamine,
hexamethylene diamine,
triethylene tetramine,
dimethylaminopropylamine,
1,8-diaminooctane,
1,12-diaminododecane,
1,6-diaminocyclohexane, dibenzylamine,
pyrrole,
pyrrolidone,
tetrahydro pyridine,
1,2-diamino-2-methyl propane,
2,3-diamino-2-methyl butane,
2,5-diamino-2,5-dimethyl hexane,
2,7-diamino,
2,7-dimethyl octane,
diaminopyridine,
piperidine,
triethanolamine,
N,N-dibutyl-1,3-propane-diamine,
N,N-dioctyl-1,3-propanediamine,
N-methyl-N-ethyl-1,3-propane-diamine,
2,6-dimethyl piperidine,
1,5-diaminocyclopentane,
ortho, meta and para-phenylene diamine,
diaminodiphenylamine,
p,p'-methylene dianiline,
diaminodiphenylsulfone,
triaminobenzene,
2,4-diaminotoluene,
3,3'-diaminodiphenyl,
1,3-diamino-4,5-diethylbenzene,
diaminostilbene, and the like.

Especially preferred amines are the aliphatic, cycloaliphatic and aromatic secondary and tertiary amines, and preferably those containing no more than 20 carbon atoms.

Also included in the expression amine curing agents are the modified curing agents, such as those obtained by reacting the amines with monoepoxides as in our copending case Serial No. 535,525, filed September 20, 1955, with acrylonitriles as in U.S. 2,753,323 or with polyepoxides as in U.S. 2,643,239.

The amount of the amine to be used in the process will vary over a wide range. Good cures are obtained by reacting the polyepoxide with at least .8 equivalents of the amine. As used herein in relation to the amount of amine and polyepoxide, the expression "equivalent" amount refers to that amount of amine needed to furnish one amine hydrogen for every epoxy group in the polyepoxide to be involved in the cure. To obtain the best results, the amine and polyepoxide should be employed in about chemical equivalent amounts and more preferably in chemical equivalent ratios of 1:1 to 1.5:1. With most amines this amounts to about 1% to 25% by weight of the polyepoxide and preferably 3 to 15% by weight.

The polyepoxides used in the process of the invention are those having more than 1 epoxy group, i.e. more than 1

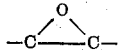

group, and preferably having a low chlorine content. The epoxy groups may be terminal, i.e.

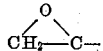

groups, or they may be in an internal position, i.e. may be

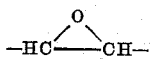

groups. Preferably, the epoxy groups are terminal. The polyepoxides may be saturated or unsaturated, aliphatic, cycloaliphatic, aromatic or heterocyclic and may be substituted with other radicals, such as hydroxyl groups, ether radicals and the like. They may also be monomeric or polymeric.

Some examples of polyepoxides of this type may be found in U.S. 2,633,458.

Especially preferred groups of polyepoxides in that their use more clearly demonstrates the unexpected superior results obtained by the claimed process are the glycidyl ethers of polyhydric phenols or alcohols having a low chlorine content described and claimed in copending application Serial No. 485,299, filed January 31, 1955, now U.S. 2,841,595, issued July 1, 1958. These glycidyl ethers are prepared by carrying out the reaction between the dihydric or polyhydric phenols or alcohols and the epichlorohydrin in two stages. In the first stage an underdose of alkali is preferably used, viz a quantity smaller than a stoichiometrically equivalent quantity of the phenol or alcohol used, preferably 90–98% of the stoichiometrically equivalent quantity. In the second stage the product formed is dechlorinated with the use of an excess of alkali.

The preparation of a low chlorine content polyepoxide by this method is illustrated below:

LOW CHLORINE CONTENT GLYCIDYL POLYETHER OF BIS-PHENOL-A (POLYETHER A)

1 mol of 2,2-bis(4-hydroxyphenol) propane (Bis-phenol-A) was dissolved in 10 mols of epichlorohydrin, whereupon 1% by weight of water was added to the mixture. After the mixture has been heated to 105° C., 163.4 grams of 47% aqueous NaOH was added at this temperature over a period of 3 hours. During the reaction epichlorohydrin and water were azeotropically distilled off in order to maintain the water content of the reaction mixture at 1% by weight. The epichlorohydrin was separated from the distillate and returned to the vessel.

After all the alkali had been added, the excess of epichlorohydrin was distilled off from the reaction mixture, first at normal pressure, and then in vacuo to a bottom temperature of 160° C. Heating was then carried out in vacuo to 160° C. for a further hour, and the mixture was subsequently cooled to 100° C.

Methyl isobutyl ketone was then added until the ratio of resin to methyl isobutyl ketone was approximately 1:1.5. The sodium chloride present in the resin was removed at approximately 40° C. by the addition of approximately 1 liter of water and separation of the aqueous solution.

912 grams of 5% aqueous NaOH were added to the remaining organic phase. The mixture was heated for 1½ hours to 85° C., whereupon, after cooling, it was separated into an aqueous and an organic phase. The organic phase was treated for 1 hour with 286 grams of a 2% aqueous NaH$_2$PO$_4$ solution. After the aqueous phase had been separated from the organic one, the methyl isobutyl ketone was distilled off from the latter in vacuo to a bottom temperature of approximately 160° C. After having been heated in a vacuo for a further hour to approximately 160° C., the residue was mixed with a filter aid and filtered at 100° C.

The product obtained had a chlorine content of 0.20% by weight, a molecular weight of 365, a melting point of 10° C. and an epoxy equivalent weight of 190. When the same resin was again prepared twice under exactly the same conditions, chlorine contents of 0.20 and 0.21% by weight was obtained.

When, however, the dechlorination stage was carried out for 1 hour only at 85° C., the chlorine content varied greatly, viz from 0.30 to 0.60% by weight. It was also found possible to obtain reproducible contents of 0.20% by weight by carrying out the dechlorination treatment for 1 hour at 85° C. with the use of an excess of 10% to 15% of sodium hydroxide.

A more detailed description of the method of preparing low chlorine content glycidyl ethers of this type may be found in the above-noted copending application.

Especially preferred resins of this type are those wherein in the second stage the dechlorination treatment is continued for such a time that the resultant resin, after being thoroughly washed from the alkali chloride formed, has a content of organically bound chlorine not exceeding 0.25% by weight and preferably lower. It has been found in practice the lowest value which could be reached was about 0.18% by weight of chlorine. Unlike the higher chlorine contents, contents of lower than 0.25% by weight are excellently reproducible.

According to the process of the invention, the polyepoxide, amine curing agent and activator are combined in the desired proportions and the mixture permitted to cure to the desired hard, insoluble infusible product. Temperatures used in the cure generally vary from about 20° C. to about 150° C. Particularly preferred temperatures range from about 50° C. to 150° C. The curing reaction is generally carried out for less than 30 hours, preferably ¼ to 20 hours.

In executing the process of the invention, it is sometimes desirable to have the polyepoxide in a mobile liquid condition when the anhydrides and activator are added in order to facilitate mixing. With those polyepoxides that are liquid, but too viscous for ready mixing, one may either heat to reduce viscosity, or have a liquid solvent added thereto in order to provide fluidity. Normally solid polyepoxides are likewise either melted or mixed with a liquid solvent. Various solvents are suitable for achieving the desired fluidity. They may be volatile solvents which escape from the polyepoxide composition containing the anhydride activator mixture by evaporation before or during the curing, such as ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate of ethylene glycol monomethyl ether), etc.; chlorinated hydrocarbons such as trichloropropane, chloroform, etc. Solvents which remain in the cured composition may also be used, such as diethyl phthalate, dibutyl phthalate, or liquid mono-epoxy compounds, including glycidyl allyl ether, glycidyl phenyl ether, styrene oxide, 1,2-hexylene oxide, glycide, and the like, as well as cyano-substituted hydrocarbons, such as acetonitrile, propionitrile, adiponitrile, benzonitrile, and the like. It is also convenient to employ the solid or semi-solid polyepoxides in combination with a liquid polyepoxide, such as a normally liquid glycidyl polyether of a polyhydric alcohol. Various other ingredients may be mixed with the polyepoxide compositions including pigments, fillers, dyes, plasticizers, resins, and the like.

The resins cured according to the invention have excellent heat distortion points. The heat distortion point is higher accordingly as the chlorine content of the resin is higher.

If desired, various other substances such as fillers, pigments, dyes, plasticizers and other resins or resin-forming materials may be present in the curing reaction in addition to curing agents and activators. The curing agent-polyepoxide systems described above may be utilized for a great variety of important applications. Because of their low temperature cure properties, they are particularly useful in the preparation of coating compositions, and because of their rapid high temperature cures are useful in the formation of baking enamels. In these applications, it is generally desirable to combine the polyepoxide with the amine and activator and desired solvents or other film-forming materials, and then apply this mixture to the surface to be coated. The coatings may then be allowed to set or heat may be applied.

The systems described above are also very useful in the preparation of electrical pottings and castings. In this application the mixture of polyepoxide, amine and activator alone or with suitable diluents is added to the desired mold or casting and then allowed to set at room temperature. Heat may be applied in some cases to hasten cure.

The above-described systems are also useful in the preparation of laminates. In this application, the sheets of fibrous material are first impregnated with the mixture of polyepoxide, amine and activator. This is conveniently accomplished by dissolving the amine and activator in acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin state. Although this operation may be conducted at room temperature (20 to 25° C.), it is preferred to use somewhat elevated temperature such as about 50° C. to 200° C. with the impregnated sheet stock passing through or handing free in an oven or other suitable equipment. The resinification is arrested before infusible product occurs by cooling below about 40° C. A plurality of the impregnated sheets are then superimposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, paper, asbestos paper, mica flakes, cotton bats, duck, muslin, canvas and the like. It is usually preferred to utilize woven glass cloth that has been given prior treatment with well known finishing or sizing agents therefor, such as chrome methacrylate or vinyl trichlorosilane.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated parts described in the examples are parts by weight.

*Example I*

100 parts by weight of the glycidyl polyether prepared as described above (polyether A) was mixed with six parts by weight of piperidine. The mixture was cured by heating it for 5 hours to 100° C. In order to determine the degree of curing, an examination was made to determine what quantity of low-molecular product could be extracted from the cured product. To this end a given quantity of the product was extracted in a finely ground state with boiling methyl ethyl ketone. This extracted quantity was found to be 23.0% by weight.

When the curing was carried out in the presence of 1.12 parts by weight of glycerol monochlorhydrin, as a result of which the chlorine content of the mixture rose to 0.56% by weight, it was found that on extracting the finely powdered cured product with methyl ethyl ketone it was only possible to isolate 3.4% by weight of low-molecular substances. With the addition of 3 parts by weight of the above-mentioned chlorine compound, as a result of which the chlorine content of the mixture rose to 1.16% by weight, it was found that only 1.8% by weight of low-molecular substances could be extracted from the powdered cured product.

In order to obtain a cured product without the addition of the above-mentioned chlorine compound, from which product only 1.8% by weight of low-molecular products could be extracted with methyl ethyl ketone, it was found that the mixture had to be heated for 12 hours to 100° C.

*Example II*

The epoxy resin prepared as shown above (polyether A) was cured for 5 hours at 100° C. with the use of 6% by weight of piperidine. After extraction in the manner indicated in Example I it was found possible to extract 23% by weight of low-molecular substances. When the curing reaction was carried out in the presence of 0.78 and 2.1% by weight of epichlorohydrin, respectively, as a result of which the chlorine content of the mixture was brought to 0.50% by weight and 1.0% by weight, respectively, it was found after curing under the above-mentioned conditions that only 6.7% by weight and 4.2% by weight, respectively, of low-molecular substances could be extracted from the cured products.

Related results are obtained by replacing polyether A in the above process with an equal amount of a glycidyl polyether produced as in Example I of copending application, Serial No. 485,299, filed January 31, 1955.

*Example III*

Varying portions of glycerol monochlorohydrin or epichlorohydrin were added to a number of batches of the epoxy resin described in Example I. The mixtures were cured in the form of castings by heating them to 100° C. for 24 hours in the presence of piperidine. The heat distortion point of the castings obtained were determined. The results are shown in the following table:

| Chlorine compound added | | Chlorine content in percent by weight of the mixture to be cured, before the addition of piperidine | Heat distortion temp. in ° C. according to ASTM, D648, 14.5 kg./cm.² |
|---|---|---|---|
| Type | Quantity in percent by weight | | |
| glycerol monochlorohydrin | 1.12 | 0.56 | 98 |
| Do | 3 | 1.16 | 109 |
| epichlorohydrin | 0.78 | 0.50 | 96 |
| Do | 2.1 | 1.00 | 105 |
| Do | | 0.20 | 89 |

Related results are obtained by replacing the piperidine with equivalent amounts of each of the following: triethylene diamine, ethylene diamine, 1,2-diamino-2-methyl propane, N,N-dibutyl-1,3-propanediamine and metaphenylene diamine.

*Example IV*

In this example, the duration of use of epoxy resin compositions is compared. By the term "duration of use" is meant the time required for a mixture of the epoxy resin described in Example I and a curing agent to reach a viscosity of 500 poises.

The results are given in the following table:

| Epoxy resin according to Example I to which 100 parts by weight were added | Chlorine content in percent by weight | Duration of use (in minutes) | |
|---|---|---|---|
| | | Piperidine (6% by weight calculated on the resin+chlorohydrin at 100° C | Diethylene triamine (10% by weight calculated on the resin+chlorohydrin) at 25° C |
| 0.3 parts by weight of glycerol monochlorohydrin | 0.20 | 150 | 69 |
| | 0.30 | 115 | 62 |
| 2.8 parts by weight of monophenyl ether of glycerol monochlorohydrin | 0.70 | 86 | 59 |

This table shows that the duration of use decreases (i.e. the curing rate increases) when the composition to be cured contains a larger amount of chlorine. This table also shows that the chlorine content has a greater effect with the use of piperidine than with the use of diethylene triamine as curing agent.

Related results are obtained by replacing the halohydrin with each of the following: allyl ether of glycerol monochlorohydrin, acetate of glycerol monochlorohydrin, and the cyclohexyl ether of glycerol monochlorohydrin.

We claim as our invention:

1. A process for resinifying and curing a polyepoxide having a

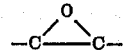

equivalency greater than 1.0 and a chlorine content not in excess of 0.25% which comprises heating at a temperature below about 150° C. the polyepoxide with from 0.1% to 30% by weight of an amine curing agent and an activator comprising a member of the group consisting of halohydrins and epihalohydrins, the said activator being employed in such quantity that the resulting mixture of polyepoxide and activator contains between about 0.50% and about 1.5% halogen.

2. A process for producing a cured product which comprises heating at a temperature below about 150° C. a glycidyl polyether of a polyhydric compound of the group consisting of polyhydric phenols and polyhydric alcohols having an epoxy equivalency greater than 1.0 and a chlorine content not in excess of 0.25% with from .1% to 30% by weight of an amine curing agent and an activator comprising a member of the group consisting of halohydrins and epihalohydrins, the said activator being employed in such quantity that the resulting mixture of glycidyl ether and activator contains between about 0.50% and about 1.5% halogen.

3. A process as in claim 2 wherein the glycidyl ether is a glycidyl polyether of a polyhydric phenol having a 1,2-epoxy equivalency between 1.1 and 2.0 and a molecular weight between 200 and 1400.

4. A process as in claim 2 wherein the glycidyl ether is a glycidyl polyether of a polyhydric alcohol having a 1,2-epoxy equivalency between 1.1 and 3 and a molecular weight between 170 and 800.

5. A process as in claim 2 wherein the amine is a secondary amine.

6. A process as in claim 2 wherein the amine is a tertiary amine.

7. A process as in claim 2 wherein the activator is a compound of the formula

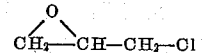

8. A process as in claim 2 wherein the activator is a phenyl ether of glycerol monochlorohydrin.

9. A process as in claim 2 wherein the mixture is heated at a temperature below 150° C. for a period of .25 to 20 hours.

10. A process for producing a cured product which comprises heating at a temperature below about 150° C. a glycidyl polyether having an epoxy equivalency greater than 1.0 and a chlorine content not in excess of 0.25% with from .1% to 30% by weight of an amine curing agent and an activator comprising glycerol monochlorohydrin, said activator being employed in such quantity that the resulting mixture of glycidyl ether and activator contains between about 0.50% and 1.5% halogen.

11. A process as in claim 2 wherein the activator is a haloepoxyalkane containing up to 8 carbon atoms.

12. A process as in claim 2 wherein the activator is glycerol dichlorohydrin.

13. A process as in claim 2 wherein the polyepoxide is a glycidyl polyether of 2,2-bis(4-hydroxyphenyl) propane.

14. A process as in claim 3 wherein the amine is diethylene triamine.

15. A process as in claim 3 wherein the amine is piperidine.

16. A curable composition comprising a mixture of a polyepoxide having a

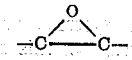

equivalency greater than 1.0 and a chlorine content not in excess of 0.25%, from 0.1% to 30% by weight of an amine epoxy curing agent and an activator comprising a material of the group consisting of halohydrins and epihalohydrins, the said activator being employed in such quantity that the resulting mixture of polyepoxide and activator contains between about 0.50% and about 1.5% halogen.

References Cited in the file of this patent
UNITED STATES PATENTS
2,528,932  Wiles et al. _____ Nov. 7, 1950